United States Patent

[11] 3,586,985

[72] Inventor Arthur J. Schoendorff, Flint, Mich.
[21] Appl. No. 885,753
[22] Filed Dec. 17, 1969
[45] Patented June 22, 1971
[73] Assignee General Motors Corporation, Detroit, Mich.

[54] VARIABLE DUTY CYCLE CONTROL GENERATOR
7 Claims, 6 Drawing Figs.

[52] U.S. Cl. .......... 328/61; 307/265, 293; 328/55, 58, 97, 112
[51] Int. Cl. .......... H03k 5/04
[50] Field of Search .......... 307/265, 269, 293, 208; 328/58, 60, 61, 74, 103, 105, 111, 112, 152, 153, 94, 97

[56] References Cited
UNITED STATES PATENTS
3,378,702 4/1968 Burke .......... 307/293X

*Primary Examiner*—Stanley D. Miller, Jr.
*Attorney*—Jean L. Carpenter and Paul Fitzpatrick

ABSTRACT: A variable duty cycle control generator having a plurality of time delay circuits, each having a common input comprised of a series of equal duration rectangular pulses for generating a plurality of pulse waveforms, each having a respective duty cycle. The waveform having the desired duty cycle is selected by gating the waveform with a respective control signal which enables the waveform to be utilized.

PATENTED JUN 22 1971 3,586,985

INVENTOR
Arthur J. Schoendorff
BY
Paul Fitzpatrick
ATTORNEY

VARIABLE DUTY CYCLE CONTROL GENERATOR

SPECIFICATION

This invention relates to a variable duty cycle control generator and more specifically to a variable duty cycle control generator which includes a plurality of time delay circuits having different delay times and having a rectangular wave input. Logic circuitry is provided for selecting any one of the leading edge time delay circuit outputs for supplying a waveform having the desired duty cycle control.

Variable duty cycle control generators presently known include those control circuits whereby the duty cycle is a function of the magnitude of the input signal. This form of a variable duty cycle control generator may lend itself to an analog system where information may be obtained from the amplitude of a signal but does not lend itself for use in a digital system where information is received in the form of signals having a uniform magnitude.

An object of this invention is to provide for a variable duty cycle control generator in which a control signal having a predetermined duty cycle may be selectively provided.

Another object of this invention is to provide for a variable duty cycle control generator utilizing digital logic techniques for use with digital systems.

The average magnitude of a rectangular waveform comprised of a series of rectangular pulses is a function of the amplitude of the rectangular pulses, the time duration of the rectangular pulses and the period of the waveform. If the amplitude of the rectangular pulses and the period of the rectangular waveform is maintained constant, the average magnitude of the waveform may be varied by varying the time duration of the rectangular pulses. This average magnitude is directly related to the duty cycle of the rectangular waveform in that the duty cycle is the relationship between the time duration of the rectangular pulses and the period of the rectangular waveform wherein an increasing percentage duty cycle connotes a rectangular pulse having a time duration approaching that of the period of the rectangular waveform. Therefore, if the leading edge of the rectangular pulses of the rectangular waveform is delayed for a specific time duration, the resulting signal is a waveform having a specific duty cycle which is less than that of the input rectangular waveform. Therefore, by varying the time that the leading edge of the input rectangular waveform is delayed, the output signal is a waveform having a variable duty cycle.

In view of the foregoing, the objects of this invention are accomplished by simultaneously delaying the leading edge of a rectangular waveform by a number of leading edge time delay circuits having preselected time constants such that the output waveform of each time delay circuit has a specific duty cycle which is a function of the time constant of its respective leading edge time delay circuit. Logic circuitry is then provided for selecting any one of the output waveforms for providing a waveform having the desired duty cycle.

The invention may be best understood by reference to the following detailed description of a preferred embodiment when considered in conjunction with the accompanying drawings in which.

Figure 1:
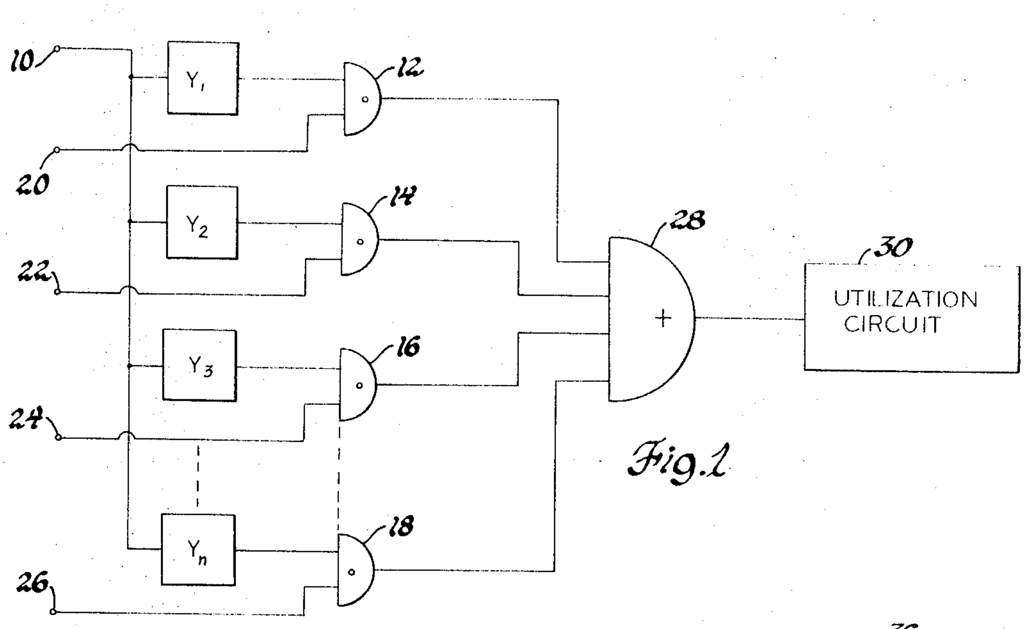
FIG. 1 is a schematic drawing of a variable duty cycle control generator illustrating the preferred embodiment of this invention.

Referring to FIG. 1, the variable duty cycle control generator is comprised of a series of leading edge time delay circuits $Y_1, Y_2, Y_3, \ldots, Y_n$ each of which has its input connected to an input terminal 10. The output of the leading edge time delay circuit $Y_1$ is connected to an input of an AND gate 12, the output of the leading edge time delay circuit $Y_2$ is connected to an input of an AND gate 14, the output of the leading edge time delay circuit $Y_3$ is connected to an input of an AND gate 16, and the output of the leading edge time delay circuit $Yn$ is connected to an input of an AND gate 18. The AND gates 12, 14, 16, and 18 also have inputs connected to the input terminals 20, 22, 24 and 26 respectively. The outputs of the AND gates 12, 14, 16 and 18 are connected to the inputs of an OR gate 28 whose output is connected to a utilization circuit 30. Each AND gate 12, 14, 16 and 18 produces an output when all its inputs are at a positive potential and the OR gate 28 produces an output when any of its inputs is a positive potential. Examples of these gates are shown in the 1969 Digital Control Handbook of the Digital Equipment Corporation on pages 17 through 19.

Figure 2:
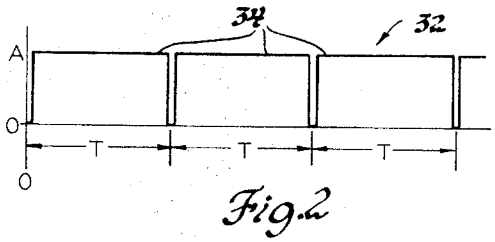
FIG. 2 is an illustration of the input waveform to the variable duty cycle control generator of FIG. 1.

The input to the input terminal 10 is a rectangular waveform 32 as shown in FIG. 2. The waveform 32 has a period $T$ and is comprised of equal duration rectangular pulses 34, whereby the time duration between the pulses 34 is short as compared to the period T. As can be seen, the average magnitude of the rectangular waveform 32 is nearly equal to the ampliutde of the rectangular pulses 34. This corresponds to a duty cycle of nearly 100%.

Figure 3:
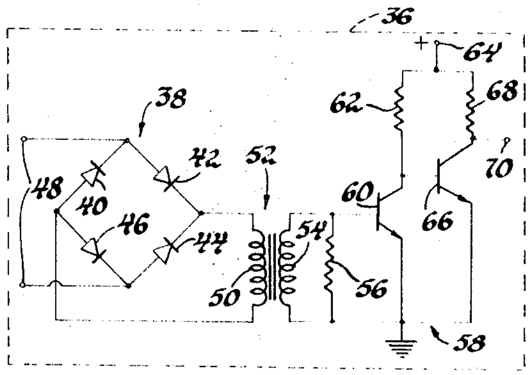
FIG. 3 is a circuit diagram of a rectangular waveform generator utilized in the preferred embodiment of this invention.

The rectangular waveform 32 may be generated by a waveform generator 36 as illustrated in FIG. 3. A full wave rectifier 38 comprised of the diodes 40, 42, 44 and 46 receives a sinusoidal input from any conventional means, such as an oscillator, across the input terminals 48. The output of the full wave rectifier 38 is connected across the primary winding 50 of a step-up transformer 52. The secondary winding 54 of the step-up transformer 52 is connected across an input resistor 56 of a Schmitt trigger circuit 58. The input resistor 56 is connected between the base electrode of a transistor 60 and ground. A load resistor 62 is connected between the collector electrode of the transistor 60 and a source of positive potential 64. The emitter electrode of the transistor is connected to ground. The base electrode of a transistor 66 is connected to the collector electrode of the transistor 60. A load resistor 68 is connected between the collector electrode of the transistor 66 and the source of positive potential 64. The emitter electrode of the transistor 66 is connected to ground. The output of the waveform generator 36 is taken from the collector electrode of the transistor 66 on an output terminal 70.

The full wave rectified output of the full wave rectifier 38 is amplified by the step-up transformer 52 whose output triggers the Schmitt trigger circuit 58 to generate on the output terminal 70 the rectangular waveform 32 in FIG. 2.

Figure 4:
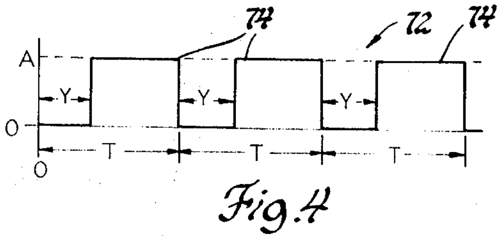
FIG. 4 is an illustration of the output waveform of the leading edge time delay networks of FIG. 1.

Referring to FIG. 4, the output of the various leading edge time delay circuits $Y_1, Y_2, Y_3, \ldots, Y_n$ is a waveform 72 comprised of a series of pulses 74 and having a period T equal to the period T of the rectangular waveform 32 of FIG. 2. The leading edges of the input equal duration rectangular pulses 32 are delayed by the leading edge time delay circuits $Y_1, Y_2, Y_3, \ldots, Y_n$ by a time Y which is determined by the respective time constants of the leading edge time delay circuits $Y_1, Y_2, Y_3, \ldots, Y_n$. As can be seen, as the time Y increases the time duration of the pulses 74 decreases and the duty cycle of the waveform 72 correspondingly decreases from 100%. Each leading edge time delay circuit $Y_1, Y_2, Y_3, \ldots, Y_n$ have preselected time constants so that its output is a waveform 72 having a specific duty cycle. As can be seen, the foregoing variable duty cycle control generator has the capability of supplying a number of waveforms with $n$ number of duty cycles wherein $n$ may be any desired number.

Figure 5:
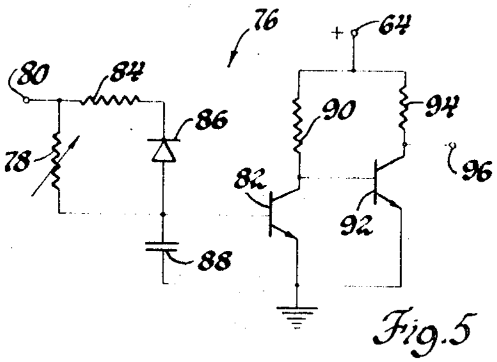
FIG. 5 is a circuit diagram of a leading edge time delay circuit of FIG. 1.

The leading edge time delay cirucits $Y_1, Y_2, Y_3, \ldots, Y_n$ may take the form of a leading edge time delay circuit 76 as shown in FIG. 5. The leading time delay circuit 76 is comprised of a variable resistor 78 connected between an input terminal 80 and the base electrode of a trnasistor 82. A current limiting resistor 84 and a diode 86 are connected in series between the input terminal 80 and the base electrode of the transistor 82 with the anode of the diode 86 connected to the base electrode of transistor 82. A capacitor 88 is connected between the base electrode of the transistor 82 and ground. A resistor 90 is connected between the collector electrode of the transistor 82 and the source of positive potential 64. The emitter electrode of the transistor 82 is connected to ground. The base electrode of a transistor 92 is connected to the collector electrode of the transistor 82. A resistor 94 is connected between the collector electrode of the transistor 92 and the source of positive potential 64. The emitter electrode of the transistor 92 is connected to ground. The output of the leading edge time delay circuit 76 is taken at the collector electrode of the transistor 92 at a terminal 96.

Figure 6:
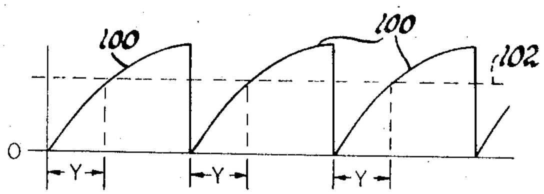
FIG. 6 is a waveform illustrating the operation of the leading edge time delay circuit of FIG. 5.

The input to the leading edge time delay circuit 76 on the input terminal 80 of FIG. 5 is the rectangular waveform 32 of FIG. 2 as taken from the output terminal 70 of the waveform generator 36 of FIG. 3. Initially, the potential on the base electrode of the transistor 82 is at ground which results in the transistor 82 being in an off condition. With the transistor 82 off, the potential on the base electrode of the transistor 92 is high which results in the transistor 92 being in an on condition resulting in the output terminal 96 being at ground potential to produce zero potential output. As the magnitude of the input waveform 32 goes from zero to A, the capacitor 88 begins to charge through the variable resistor 78 as seen in the waveform 100 of FIG. 6. As the capacitor 88 charges, the potential on the base electrode of the transistor 82 reaches a trigger level 102 as illustrated in FIG. 6 at which point the transistor 82 is turned on which results in the transistor 92 turning off to place the output terminal 96 at the voltage level of the source of positive potential 64. As the input waveform 32 goes to ground potential, the capacitor 88 is discharged through the diode 86 and the current limiting resistor 84 and the input terminal 80 to ground through the output terminal 70 and the collector and emitter electrodes of the transistor 66 in the waveform generator 36 of FIG. 3. The discharge time is very fast since the resistor 84 is very small. When the capacitor 88 discarges, the transistor 82 is turned off which results in the transistor 92 turning on to again place the output terminal 96 at ground potential. In this manner, the waveform 72 of FIG. 4 is generated at the output of the leading edge time delay circuits $Y_1$, $Y_2$, $Y_3$, . . ., $Y_n$. As seen in FIG. 6, the leading edge time delay Y is determined by the time duration between the time when the capacitor 88 begins to charge and the time at which the capacitor 88 is charged to the trigger level 102 to turn the transistor 92 off. This charging time which represents the time delay Y may be varied by increasing or decreasing the resistance of the variable resistor 78 to control the duty cycle of the output waveform 72.

The operation of the variable duty cycle generator is as follows:

With the input rectangular waveform 32 applied to the input terminal 10, the time delays of the various time delay circuits $Y_1$, $Y_2$, $Y_3$, . . . $Y_n$ are adjusted to produce a desired plurality of output waveforms 72 having respective time delays Y and the resulting corresponding duty cycles. The outputs of the leading edge time delay circuits $Y_1$, $Y_2$, $Y_3$, . . . $Y_n$ are then selectively enabled to supply a signal having the desired duty cycle to the utilization circuit 30 by selectively supplying a positive potential to the input terminal 20, 22, 24, or 26. This positive potential is gated with the output waveform 72 by the AND gate 12, 14, 16 or 18 selected to provide the desired duty cycle waveform 72.

Although the preferred embodiment as previously described illustrates specific circuits for providing the desired input waveform and leading edge time delays, these circuits are shown for illustration purposes only. It is understood that any circuit for providing those functions may be utilized.

The variable duty cycle control generator described is particularly suited for use with a digital system in that the desired duty cycle signal is selected by using digital logic techniques. In addition, the variable duty cycle control generator may be operated from uniform magnitude signals which are characteristic of digital systems.

What has been described is a variable duty cycle control generator which provides for selectable, predetermined duty cycle waveforms and which is suitably adapted for use in a digital system.

What is claimed is:

1. A variable duty cycle control generator comprising, in combination, a source of equal duration rectangular pulses defining a waveform having a specified period, a plurality of time delay means each of which is connected to the source of equal duration rectangular pulses and is responsive thereto for generating a series of pulses having a time duration less than the time duration of the equal duration rectangular pulses and having a period equal to the specified period, and means for selectively coupling any one of the time delay means to an output to supply a series of output pulses.

2. The variable duty cycle control generator in claim 1 whereby each time delay means has a respective time delay different from the time delays of the remaining time delay means and the time duration of each pulse of the series of output pulses corresponds to the selected time delay means.

3. A variable duty cycle control generator comprising, in combination, a source of equal duration rectangular pulses defining a waveform having a specified period, a plurality of leading edge time delay means each of which is connected to the source of equal duration rectangular pulses and is responsive thereto for generating a series of pulses whose leading edges are delayed a specified time duration with respect to the equal duration rectangular pulses and having a period equal to the specified period, and means for selectively coupling any one of the leading edge time delay means to an output to supply a series of output pluses each having a time duration which is the specified time duration less than the time duration of the equal duration pulses.

4. The variable duty cycle control generator in claim 3 whereby the time duration between the equal duration rectangular pulses is short as compared to the specified period.

5. The variable duty cycle control generator in claim 4 whereby each leading edge time delay means has a respective time delay different from the time delays of the remaining leading edge time delay means and the time duration of each pulse of the series of output pulses corresponds to the selected leading edge time delay means.

6. The variable duty cycle control generator in claim 3 whereby the means for selectively coupling any one of the leading edge time delay means to an output includes a plurality of AND gates whereby each AND gate logically gates the output of a respective leading edge time delay means with an enabling signal.

7. The method of generating a variable duty cycle control signal including the steps of generating a series of equal duration rectangular pulses, simultaneously delaying the leading edge of the equal duration rectangular pulses for a plurality of time durations so as to provide a number of waveforms each having pulses of a given time duration, and enabling the waveform having pulses of the desired time duration.